United States Patent [19]

Leoni et al.

[11] 4,337,095

[45] * Jun. 29, 1982

[54] PROCESS FOR THE PREPARATION OF SOLUTIONS OF CELLULOSE DERIVATIVES IN ORGANIC SOLVENTS HAVING HIGHER CONCENTRATION AND SOLUTIONS OBTAINED BY SAID PROCESS

[75] Inventors: Roberto Leoni, Milan; Alberto Baldini, Garlasco; Angelo Calloni; Gianfranco Angelini, both of Buscate, all of Italy

[73] Assignee: SNIA Viscosa S.p.A. - Societa' Nazionale Industria Applicazioni Viscosa, Milan, Italy

[*] Notice: The portion of the term of this patent subsequent to May 19, 1998, has been disclaimed.

[21] Appl. No.: 155,113

[22] Filed: May 30, 1980

[30] Foreign Application Priority Data

Jun. 7, 1979 [IT] Italy .................................. 23350 A/79

[51] Int. Cl.$^3$ ........................ C08B 16/00; C08L 1/02; C08L 1/08

[52] U.S. Cl. ............................... 106/203; 106/168; 536/56; 536/57

[58] Field of Search ............... 106/163, 186, 187, 203; 536/56, 57

[56]         References Cited

U.S. PATENT DOCUMENTS 4,237,274  12/1980  Leoni et al. ......................... 536/56
4,268,666   5/1981  Baldini et al. ...................... 536/56

Primary Examiner—Theodore Morris
Attorney, Agent, or Firm—Wenderoth, Lind & Ponack

[57]         ABSTRACT

A process for the preparation of high concentration solutions of cellulose derivatives in organic solvents comprises contacting with paraformaldehyde and the solvent a cellulose which has a polymerization degree lower than 300 and preferably not significantly higher than 200. The solvent is selected from among dimethylformamide, dimethylacetamide and N-methylpyrrolidone.

9 Claims, No Drawings

PROCESS FOR THE PREPARATION OF SOLUTIONS OF CELLULOSE DERIVATIVES IN ORGANIC SOLVENTS HAVING HIGHER CONCENTRATION AND SOLUTIONS OBTAINED BY SAID PROCESS

BACKGROUND OF THE INVENTION

In Italian applications No. 21922 A/78 and 28527 A/78 (corresponding to U.S. Pat. No. 4,268,666); of the same Assignee a process is described for obtaining solutions of cellulose derivatives, ordinarily called "methylol derivatives" even though their exact chemical structure is not certain, in organic solvents, particularly dimethylformamide (DMF), dimethylacetamide (DMAC) and N-methylpyrrolidone. Said process consists in contacting cellulose with paraformaldehyde and with the solvent at high temperature, preferably 120° C.–130° C. The molar ratio of $CH_2O$ units of the formaldehyde to anhydroglucosidic units of the cellulose (hereinafter called, for the sake of brevity, "$CH_2O$/cellulose ratio") is about 13 and is then reduced, by degassing or in other ways, even down to 3, to facilitate the coagulation of the cellulose derivative in suitable coagulating baths and the subsequent regeneration of the cellulose, which permit the production of formed bodies, e.g. filaments, of regenerated cellulose.

The cellulose content of the solutions is at most about 14–15% (all the percentages and parts in this description are by weight). It is obvious that it would be desirable to prepare solutions at higher cellulose concentration which would render the spinning more efficient and would permit the use of smaller amounts of solvents, which must then be recovered.

SUMMARY OF THE INVENTION

The Applicants have now surprisingly discovered, and this is the object of the present invention, that more concentrated solutions may be prepared in the same way, if a cellulose is employed which has a polymerization degree (DP) lower than 300 and preferably not substantially higher than 200. Under such conditions, solutions are obtained which have high cellulose contents, preferably between 16 and 20%.

Said concentrated solutions may have a doughy consistency at room temperature, but at high temperatures, preferably between 120° and 160° C., they are sufficiently fluid to be spun.

DESCRIPTION OF THE PREFERRED EMBODIMENTS

The technique for preparing the solution is the same is described in the aforementioned applications. The mixture of paraformaldehyde, solvent and cellulose is heated to the dissolution temperature and the solution thus obtained is then degassed or placed in communication with a vessel which is cold and under a vacuum to reduce the formaldehyde content, preferably to a value corresponding to a $CH_2O$/cellulose ratio of not less than 3, more preferably between 5 to 10. In order to facilitate dissolution it is desirable to operate at a temperature between 130° and 160° C., preferably higher than 135° C. (The initial $CH_2O$/cellulose ratio is preferably not lower than 8, more preferably between 8 and 15).

The preferred solvent is DMAC, which should be preferably free from acetic acid and should contain not more than 0.1% of water.

The invention will be better understood from the following non limitative embodiments.

EXAMPLE 1

64 parts of a soluble wood pulp irradiated with $\gamma$ rays until a DP of about 200 has been obtained, dried in an air circulation oven for one hour, are mixed with 144 parts of commercial paraformaldehyde (purity higher than 95%) and 192 parts of distilled DMAC (water content not higher than 0.1%) in a closed reactor completely jacketed and provided with an efficient stirrer. The mixture is heated under stirring to about 140°–145° and is maintained at such temperature for 1 hour and 30 minutes. A clear solution is obtained. The reactor head is then placed in connection with a cold vessel in which a vacuum has been previously formed and in said vessel the formaldehyde which evolves from the hot solution is collected as solid paraformaldehyde. The degassing is continued for 15 minutes, whereafter the solution, which has remained clear and fluid while hot, is cooled. During the cooling a solid mass is obtained at 120°, which mass contains 18.2% of cellulose and 25.8% of $CH_2O$.

EXAMPLE 2

A solution is prepared as in the previous example starting from 52 parts of a soluble wood pulp (DP about 200), 116 parts of commercial paraformaldehyde (purity higher than 95%) and 232 parts of distilled DMAC (water content less than 0.1%). A clear solution is obtained at 140°–150° C. The solution is then degassed in the way described in the previous example for about 45 minutes and a sample is taken. The sample becomes semi-solid when cooled, but when heated once again to 70° C. becomes fluid once more to a sufficient degree to be distributed on glass plates and drawn into thin films. The cellulose concentration is 15.2% while the $CH_2O$ concentration is 21%. By continuing the degassing of the solution at 130°–140° C. for 30 minutes more and cooling, a jelly-like mass is obtained which contains 16.5% cellulose and 12.5% $CH_2O$.

EXAMPLE 3

A solution is prepared in same way as in the preceding examples, starting from 64 parts of a soluble wood pulp (DP about 200), 150 parts of commercial paraformaldehyde (purity higher 95%) and 192 parts of distilled DMF (water content less than 0.1%). A clear solution is obtained at 140°–150°. Said hot solution, spread on a glass plate, drawn into thin films and coagulated in a 5% $NH_3$ aqueous bath, yields regenerated cellulose films. The cellulose concentration in the solution is about 16.5%.

EXAMPLE 4

A solution is prepared in same way as in the preceding examples, starting from 64 parts of a soluble wood pulp (DP about 200), 144 parts of commercial paraformaldehyde (purity higher than 95%) and 192 parts of N-methylpyrrolidone (water content about 0.05%). A clear solution is obtained at 140°–150° in about 1 hour. The solution is then degassed for 15 minutes in the way described in the preceding examples and a sample is taken, which when spread hot on the glass plates and drawn into thin films and coagulated in a 5% $NH_3$ aqueous bath, yields regenerated cellulose films. The cellulose content of the solution after degassing is about 17.5%.

We claim:

1. A process for the preparation of a solution of a methylol derivative of cellulose in an organic solvent, comprising contacting cellulose having a polymerization degree lower than 300 with paraformaldehyde and with the solvent at a temperature sufficiently high to dissolve the cellulose.

2. Process according to claim 1, wherein the solvent is dimethylformamide, dimethylacetamide or N-methylpyrrolidone.

3. Process according to claim 2, wherein the solvent is dimethylacetamide substantially free from acetic acid and containing not more than 0.1% of water.

4. Process according to claim 1, wherein the dissolution temperature is higher than 135° C.

5. Process according to claim 1, wherein the initial $CH_2O$/cellulose ratio is not lower than 8.

6. Process according to claim 1, wherein the polymerization degree of the cellulose is not substantially higher than 200.

7. Process according to claim 1, further comprising treating the solution to reduce its formaldehyde content to a value corresponding to a $CH_2O$/cellulose ratio not less than 3.

8. Process according to claim 7, wherein the formaldehyde content of the solution is reduced to a value corresponding to a $CH_2O$/cellulose ratio of from 5 to 10.

9. A solution of a methylol derivative of cellulose in an organic solvent having a cellulose content of from 16 to 20%, by the process according to claim 1.

* * * * *